(12) United States Patent
DeJule et al.

(10) Patent No.: US 6,541,774 B1
(45) Date of Patent: Apr. 1, 2003

(54) RADIATION IMAGER COVER

(75) Inventors: Michael C. DeJule, Clifton Park, NY (US); Stanley J. Lubowski, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 47 days.

(21) Appl. No.: 09/704,594

(22) Filed: Nov. 3, 2000

(51) Int. Cl.⁷ .............................. H01L 31/18; G01T 1/24
(52) U.S. Cl. ................ 250/370.11; 250/370.08
(58) Field of Search ................ 250/370.11, 370.08, 250/370.09, 370.1, 368, 366, 483.1, 580; 257/433; 438/64

(56) References Cited

U.S. PATENT DOCUMENTS

| | | | |
|---|---|---|---|
| 5,132,539 A | * 7/1992 | Kwasnick et al. | 250/361 |
| 5,179,284 A | 1/1993 | Kingsley et al. | |
| 5,401,668 A | * 3/1995 | Kwasnick et al. | 437/3 |
| 5,430,298 A | * 7/1995 | Possin et al. | 250/370.11 |
| 5,463,225 A | * 10/1995 | Kwasnick et al. | 250/370.11 |
| 5,517,031 A | 5/1996 | Wei et al. | |
| 5,585,280 A | 12/1996 | Kwasnick et al. | |
| 5,641,984 A | * 6/1997 | Aftergut et al. | 257/433 |
| 5,707,880 A | * 1/1998 | Aftergut et al. | 437/3 |
| 6,031,234 A | * 2/2000 | Albagli et al. | 250/370.11 |
| 6,146,489 A | * 11/2000 | Wirth | 156/280 |
| 6,278,118 B1 | * 8/2001 | Homme et al. | 250/370.11 |

OTHER PUBLICATIONS

Radiation Imager Having Light Absorbing Layer, Douglas Albagil et al., 09/472,929 (RD–25,569) Filed, Dec. 27, 1999.
End Cap and Sealing Method for Imager, Ching–Yeu Wei et al., 09/433,754, (RD–26,498) Nov. 4, 1999.
Robust Cover Plate for Radiation Imager, Michael Clement DeJule et al., 09/097,165,(RD–26,208) Jun. 15, 1998.

* cited by examiner

*Primary Examiner*—Constantine Hannaher
*Assistant Examiner*—Otilia Gabor
(74) *Attorney, Agent, or Firm*—Donald S. Ingraham; Christian G. Cabou

(57) ABSTRACT

A radiation imager includes a photosensor array disposed on a substrate. The photosensor array is optically coupled to a scintillator. A cover plate is disposed over the photosensor array, and the cover plate fully comprises a light absorbing layer interposed between the scintillator and the cover plate.

21 Claims, 4 Drawing Sheets

RADIATION IMAGER COVER

BACKGROUND OF THE INVENTION

This invention relates generally to digital imaging, and more particularly to x-ray detector imaging.

Radiation imagers, such as digital x-ray imagers, typically include a scintillator coupled to a photosensor array. The radiation to be detected, x-rays for example, are absorbed by the scintillator material with the release of electrons which are converted to optical photons inside the scintillator that in-turn are detected by photodiodes which accumulate charge corresponding with the incident photons. The charge is read out by drive electronics to provide electrical signals corresponding to the radiation image. Commonly the imager has a reflective layer disposed over the scintillator reflecting optical photons from the top surface underneath the scintillator back towards the diode detector located underneath the scintillator. Typically, the reflective layer is incorporated in digital x-ray imagers to optimize the capture of optical photons and thus increase the conversion factor (CF). The CF is a measure of the detector's ability to convert x-rays into electrons. Thus, CF increases because more photons are incident on the photodiode array.

One undesirable side effect of the reflective layer is that it can reduce the panel's modulation transfer function (MTF). The MTF is a measure of the relative amount of x-ray modulation on a scale of zero to one at a given resolution (line pairs per mm). The reflective layer reduces the detector MTF by scattering some of the light into adjacent pixels and thus reducing the panel's resolution. The presence of the reflective layer on a CsI scintillator, for example, can reduce the Mm by 10 to 20 percent as compared to a scintillator without a reflective layer. Furthermore, over time, moisture or chemicals released from reflective layer when heated (e.g. in the range about 75 to about 85 degrees Celsius), as may occur in shipping, can adversely affect scintillator performance and result in an MTF loss of another 10 to 20 percent with respect to an un-heated panel.

In cardiac imaging the beating heart is x-rayed in real time and thus many images are exposed in rapid succession. As a result, there is an increase in radiation exposure to the hospital staff and the patient. Therefore, a highly reflective layer is desirable to reduce the x-ray dose while maintaining a good image. The highly reflective layer increases the number of photons captured per incident x-ray and thus, by definition, the CF increases. In certain types of imaging, for example, rad (chest) and mammography, the need for high CF afforded by a reflective layer is not as critical as in cardiac imaging. In such imaging, it is desirable to have an imager with reduced optical cross-talk between pixels and thus the MTF is increased. Accordingly, there is a need in the art for an improved radiation imager that provides an MTF appropriate for x-ray imaging.

SUMMARY OF THE INVENTION

A radiation imager includes a photosensor array disposed on a substrate. The photosensor array is optically coupled to a scintillator. A cover plate is disposed over the photosensor array, and the cover plate further comprises a light absorbing layer interposed between the scintillator and the cover plate.

DETAILED DESCRIPTION OF THE INVENTION

Figure 1:
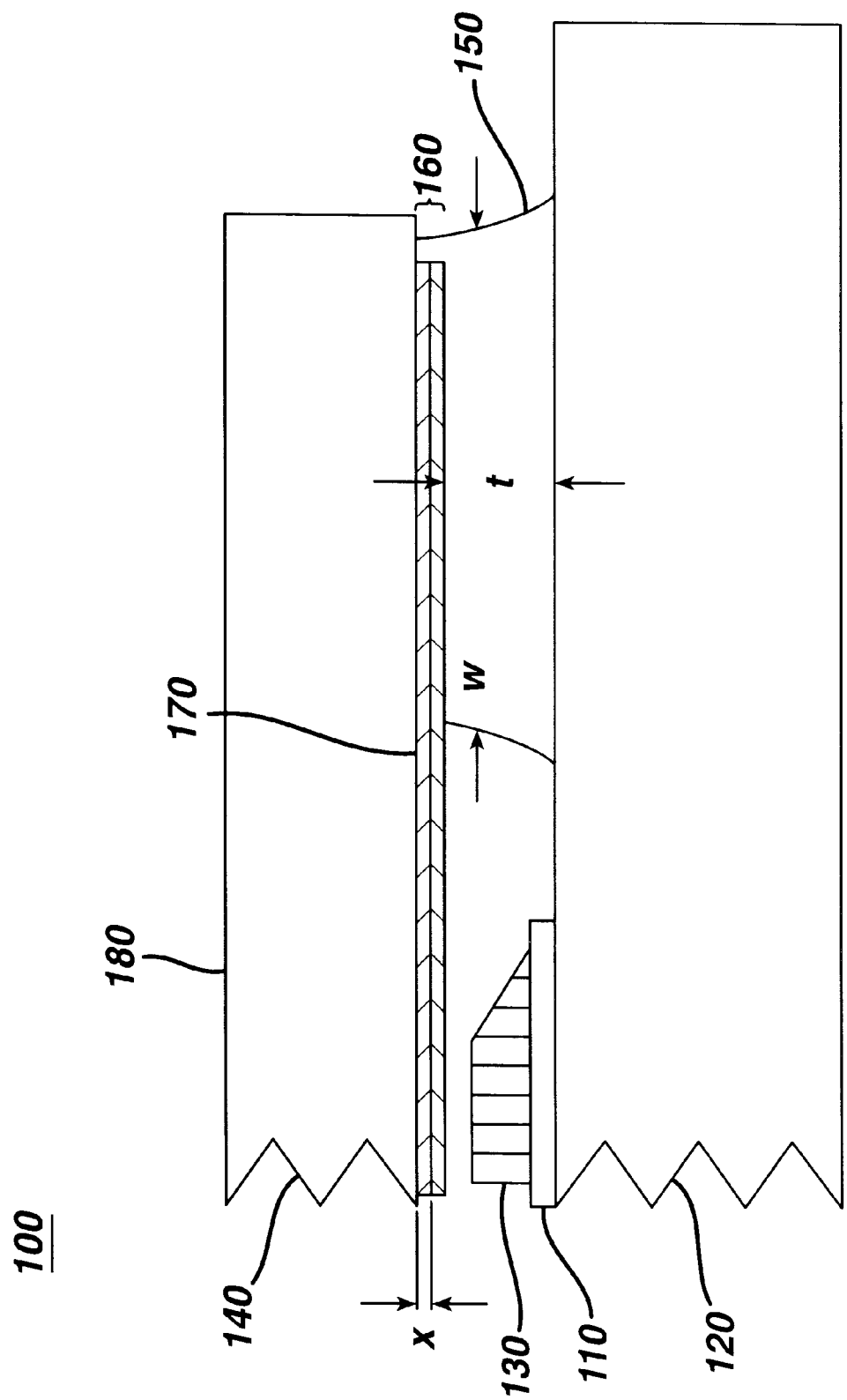
FIG. 1 is a cross sectional view of a portion of radiation imager in one embodiment of the present invention.

FIG. 1 is a cross sectional view of a portion of a radiation imager 100. By way of example and not limitation, radiation imager 100 typically comprises a photosensor array 110 disposed on a substrate 120. A scintillator 130 is optically coupled to photosensor array 110. A protective cover plate 140 is disposed over scintillator 130 so as to protect scintillator 130 from exposure to ambient conditions, such as moisture in the air. Cover plate 140 is typically secured to imager 100 by means of a seal 150, such as epoxy or the like, which is disposed on substrate 120, typically as a bead of adhesive along the edge of substrate 120 so as to surround photosensor array 110. A light absorbing layer 160 is disposed on surface of cover plate 140.

Radiation imager 100 is positioned so that radiation, for example, x-rays and the like (not shown) that have passed through the object that are being imaged is incident on scintillator 130. Incident radiation is typically absorbed in the scintillator 130 by the scintillator material in an event resulting in the generation of optical photons. Photosensor array 110 detects the optical photons emitted when the incident radiation is absorbed by the scintillator material. As a result, this detection enables the generation of electrical signals corresponding to the pattern of the incident radiation.

Photosensor array 110 is optically coupled to scintillator 130 that is disposed over photosensor array 110. "Optically coupled," as used herein, refers to the arrangement of the scintillator 130 and photosensor array 110 so that optical photons from the scintillator 130 readily pass from the scintillator 130 into the photosensor array 110. As used herein, "over", "above", "under" and the like are used to refer to the relative location of elements of radiation imager 100 as illustrated in the Figures and is not meant to be a limitation in any manner with respect to the orientation or operation of radiation imager 100. Photosensor array 110 detects the optical photons and generates a corresponding electrical signal. Suitable scintillators comprise a scintillating material selected to have a high absorption cross-section for radiation of the type it is desired to detect with radiation imager 100. For example, for detection of x-rays, scintillator 130 typically comprises CsI, doped with thallium or alternatively doped with sodium, deposited by thermal evaporation. An exemplary doping level for sodium or thallium is typically in the range between about 0.1% and about 10% by weight. Alternatively, scintillator 130 comprises a fiber optic scintillator material or other body of material, for example, terbium-activated silicate luminescent glasses. Scintillator 130 typically has an exemplary thickness in the order of about 0.1 mm to about 1.0 mm. The useful life of radiation imager 100 can be compromised by exposure of scintillator components to ambient conditions, e.g., moisture in the air will quickly degrade the functionality of CsI as a scintillator material.

A seal 150 typically has an exemplary thickness (between substrate 120 and cover plate 140 denoted by "t" in the Figure) of about 0.5 mm and a respective width (along the axis of contact with surface of substrate 120 and cover plate 140 denoted by "w" in the Figure) of about 3 mm. Substrate 120 is bonded to a cover plate 140 by the seal 150 providing a hermetically sealed moisture resistant chamber surrounding photosensor array 110 and scintillator 130.

Cover plate 140 typically comprises a protective cover laminate structure for radiation imager 100 comprising at least two multiple layers bonded together to form a single workpiece. Cover plate 140 is disposed adjacent to (as shown in FIG. 1), but not necessarily in physical contact with, the entirety of the scintillator 130 surface.

As shown in FIG. 1, at least one light absorbing layer 160 is disposed on cover plate 140 first surface 170. Light absorbing layer 160 disposed on cover plate 140 reduces the scattering of optical photons into adjacent pixels and reduces the noise so as to improve the MTF of the array to provide a high efficiency radiation imager 100. "High efficiency," as used herein, refers to an array having characteristics in which there is a reduction of cross talk (optical photons reflected within scintillator 130 so as to be incident on photosensor array 110 pixels other than the ones disposed immediately below the portion of the scintillator 130 where the photons are released) between about 75 percent and about 100 percent with respect to an imager 100 in which initially does not have a light absorbing layer 160 to an imager 100 in which a light absorbing layer 160 is added to the cover plate 140 surface. Light absorbing layer 160 typically has a thickness (denoted by "x" in the Figure) in the range between about 2.5 $\mu$m and about 250 $\mu$m. In one embodiment, a light absorbing layer 160 comprises anodized aluminum that typically has a thickness in the range between about 5 $\mu$m and about 50 $\mu$m. In another embodiment, a light absorbing layer 160 comprises paint typically having a thickness in the range between about 25 $\mu$m and about 250 $\mu$m.

In the embodiment shown in FIG. 1, light absorbing layer 160 extends substantially over the entirety of cover plate 140 first surface 170. In this embodiment, about 90 percent or more of cover plate 140 first surface 170 is covered by light absorbing layer 160 with some peripheral portions of the cover plate 140 typically not covered. Placement of light absorbing layer 160 over cover plate surface 140 reduces the amount of optical photons reflected.

Light absorbing layer 160 typically comprises at least one layer of light absorbing material. Light absorbing layer 160 typically comprises, for example, ink dyes, anodized aluminum, paints or polymer materials and can be adhered to cover plate 140 surface with a tie layer (not shown). In one embodiment, light absorbing layer 160 comprises ink dyes such as provided by a black marker (for example, a black Paper Mate™ w 10 marker obtained from the Paper Mate Company). In addition, polymer materials may include light absorptive additives such as carbon black, for example, to target the level of absorption desired by the light absorbing layer 160.

In another embodiment, light absorbing layer 160 desirably predominantly (or preferentially) absorbs a portion of spectrum of light, for example, light having a wavelength in the range of infrared to ultra-violet (10 nm to 10,000 nm). "Preferential absorption" occurs when the photons are absorbed primarily in one or more selected bands of radiation within the spectrum. For example, if scintillator 130 radiates optical photons predominantly having a wavelength in the range between about 500 nm and about 510 nm, then light absorbing layer 160 commonly is selected to also absorb all wavelengths in this band. The light absorbing layer 160 typically causes a reduction of light detected by photosensor array 110 in the range between about 10 percent and about 5 percent due to preferential absorption.

Figure 2:
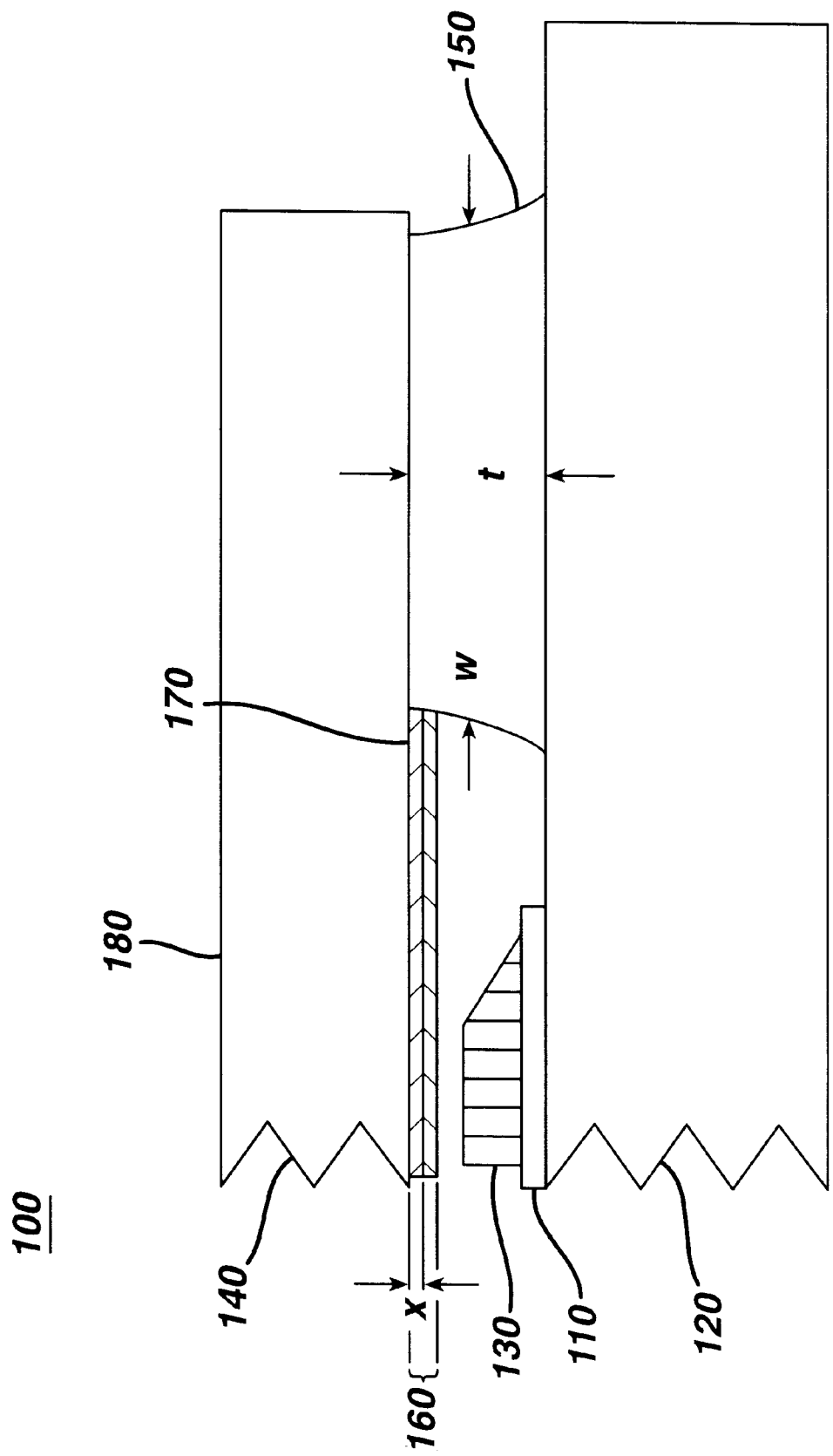
FIG. 2 is a cross sectional view of a radiation imager in another embodiment of the present invention.

FIG. 2 is a cross sectional view of radiation imager 100 with light absorbing layer 160 patterned to extend over less than the entirety of the cover plate 140 first surface 170. "Patterned," as used herein, means that light absorbing layer 160 is placed on the cover plate 140 only to cover selected areas. For example, in this embodiment, light absorbing layer 160 is adjacent to, but does not extend beyond the seal 150 area. As shown in FIG. 2, light absorbing layer 160 has been patterned such that there is no light absorbing layer 160 between the seal 150 and cover plate 140. In this embodiment, the absence of light absorbing layer 160 disposed between the seal 150 and a portion of cover plate 140 provides for better adhesion between seal 150 and cover plate 140 surface.

Figure 3:
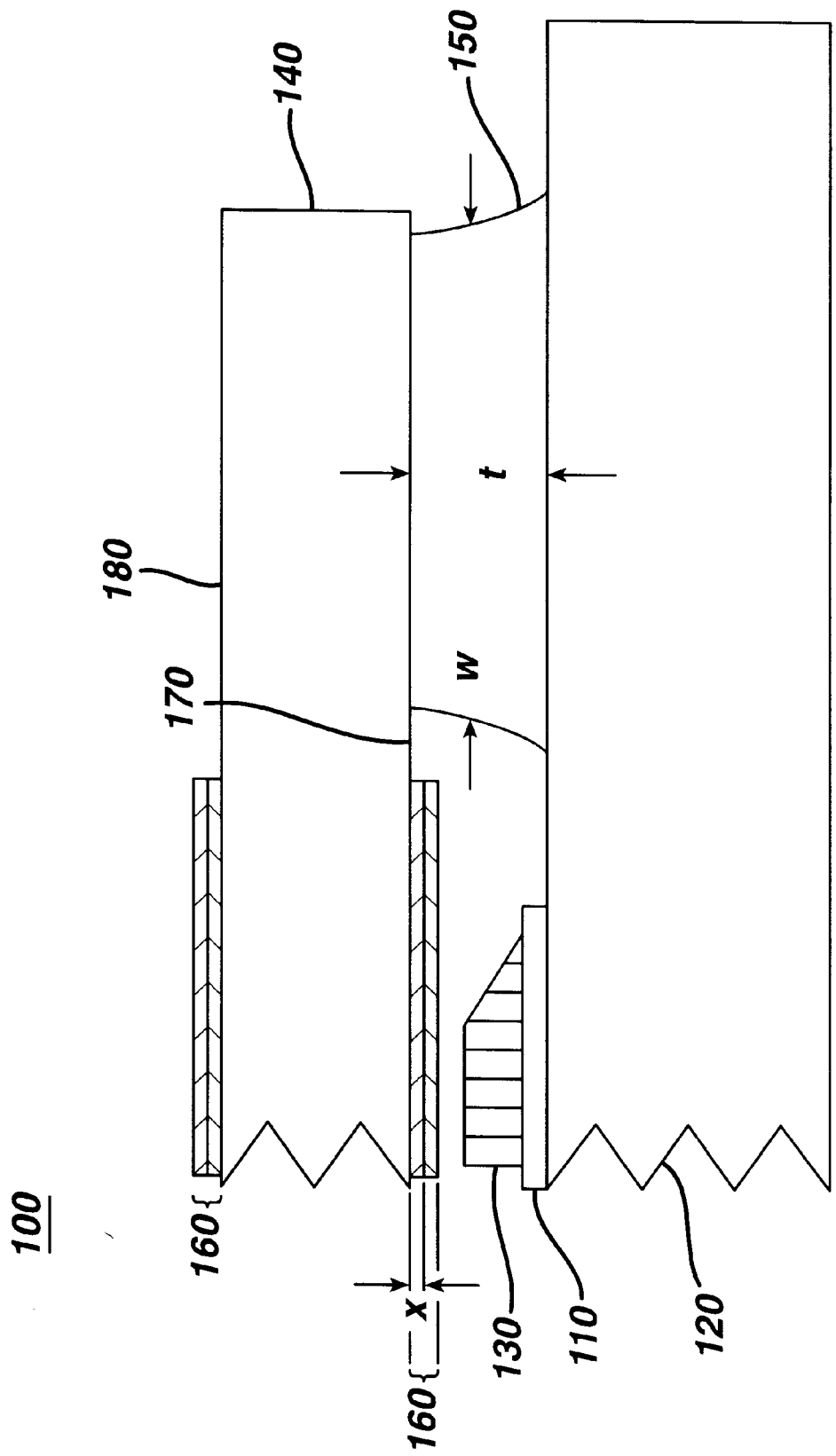
FIG. 3 is a cross sectional view of a radiation imager in another embodiment of the present invention.

FIG. 3 is a cross sectional view of radiation imager 100 with light absorbing layer 160 patterned to extend over less than the entirety of the cover plate first surface 170 and also centered over cover plate second surface 180. In this embodiment, light absorbing layer 160 is disposed in parallel fashion to cover plate first surface 170 and also to cover plate second surface 180. The light absorbing layer 160 is adjacent to, but does not extend beyond the seal 150 area. "Parallel fashion" as used herein, refers to a light absorbing layer 160 positioned on cover plate first surface 170 and another light absorbing layer 160 positioned on cover plate second surface 180. For example, having light absorbing layer 160 disposed on both first 170 and second 180 surfaces of the cover plate 140 aids in preventing warping during thermal fluctuations due to differences in the coefficients of thermal expansion of cover plate 140 and light absorbing layer 160.

Figure 4:
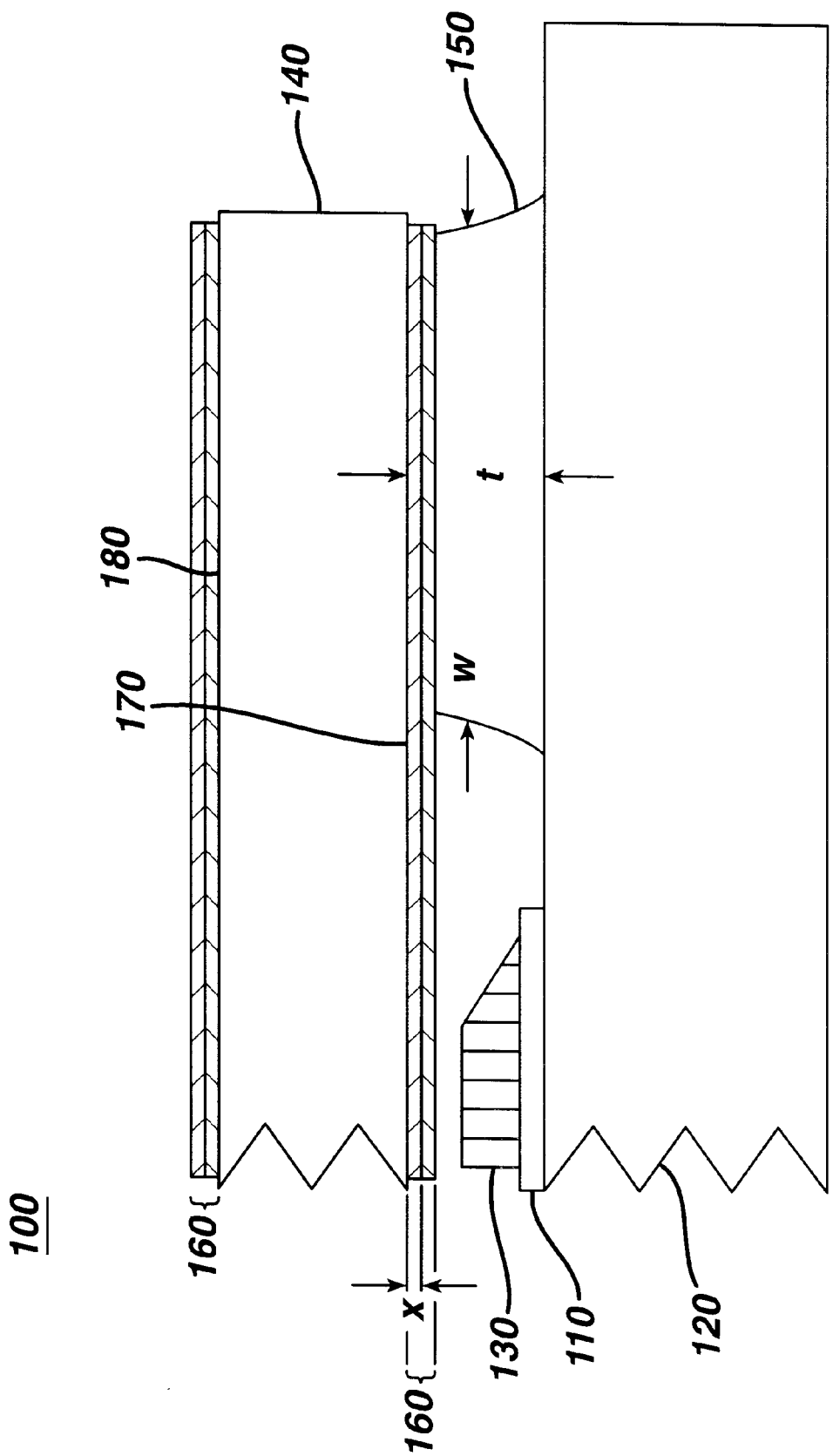
FIG. 4 is a cross sectional view of a radiation imager in another embodiment of the present invention.

FIG. 4 is a cross sectional view of radiation imager 100 with light absorbing layer 160 disposed substantially over cover plate first surface 170 and cover plate second surface 180. In this embodiment, for example, light absorbing layer 160 is disposed on at least about 90% of cover plate 140 surface area. As discussed in the third embodiment in FIG. 3, application of light absorbing layer 160 to both surfaces of cover plate 140 allows for compensation of thermal expansion of cover plate 140 and light absorbing layer 160 to prevent deformation of cover plate 140 during the cooling phase in fabrication, for example.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

We claim:

1. A radiation imager comprising:
   a substrate having a surface;
   a photosensor array disposed on said substrate surface,
   a scintillator, having a first surface and a second surface, said first surface being disposed so as to be adjacent to said photosensor array and said scintillator second surface being disposed opposite said first surface;
   a cover plate, having a first surface and second surface, wherein said cover plate first surface is disposed adjacent to said scintillator; and
   a light absorbing layer disposed at least on said cover plate first surface so as to be interposed at least between said cover plate and said scintillator second surface.

2. The radiation imager of claim 1, wherein said light absorbing layer is selected from the group consisting of ink dyes, anodized aluminum, paints, and polymer materials.

3. The radiation imager of claim 2, wherein said polymer materials comprise at least one light absorptive additive.

4. The radiation imager of claim 3, wherein said light absorptive additive comprises carbon black.

5. The radiation imager of claim 1, wherein said light absorbing layer has a thickness in the range between about 0.1 µm and about 5 µm.

6. The radiation imager of claim 1, wherein said light absorbing layer is selected to provide preferential absorption corresponding to the wavelengths of the optical photons generated by the scintillator.

7. The radiation imager of claim 6, wherein said wavelengths are in the range between about 10 nm and about 10,000 nm.

8. The radiation imager of claim 6, wherein said wavelentgh is in the range between about 500 nm and about 510 nm.

9. The radiation imager of claim 1, wherein said light absorbing layer is patterned to extend over the entirety of said cover plate first surface.

10. The radiation imager of claim 1, wherein said light absorbing layer is patterned to extend over less than the entirety of the cover plate first surface.

11. The radiation imager of claim 1, wherein said light absorbing layer is patterned to extend in a parallel fashion over both said cover plate first and second surfaces.

12. The radiation imager of claim 1, wherein said light absorbing layer is disposed substantially over said cover plate first surface and said cover plate second surface.

13. The radiation imager of claim 1, wherein said light absorbing layer is disposed substantially over the entirety over said cover plate first surface.

14. A high efficiency radiation imager comprising:
   a substrate having a surface;
   a photosensor array disposed on said substrate surface,
   a scintillator, having a first surface and a second surface, said first surface being disposed so as to be adjacent to said photosensor array and said scintillator second surface being disposed opposite said first surface;
   a cover plate, having a first surface and second surface, wherein said cover plate first surface is disposed adjacent to said scintillator;
   a light absorbing layer disposed at least on said cover plate first surface so as to be interposed at least between said cover plate and said scintillator second surface; and
   a seal disposed around the peripheral edges of said cover plate so as to provide a hermetic seal between said cover plate and said substrate.

15. The high efficiency radiation imager of claim 14, wherein said light absorbing layer is adjacent to but does not extend between said seal and said cover plate.

16. The high efficiency radiation imager of claim 14, wherein said seal is disposed between both said cover plate and said substrate.

17. The high efficiency radiation imager of claim 14, wherein said light absorbing layer is disposed between said cover plate and said seal.

18. The high efficiency radiation imager of claim 14, wherein said light absorbing layer is selected from the group consisting of ink dyes, anodized aluminum, paints, and polymer materials.

19. The high efficiency radiation imager of claim 14, wherein said light absorbing layer is selected to provide preferential absorption corresponding to the wavelength of the optical photons generated by the scintillator.

20. The high efficiency radiation imager of claim 19, wherein said wavelength is in the range between about 10 nm and about 10,000 nm.

21. The radiation imager of claim 19, wherein said wavelength is in the range between about 500 nm and about 510 nm.

* * * * *